(12) United States Patent
Horigome et al.

(10) Patent No.: US 8,334,042 B2
(45) Date of Patent: Dec. 18, 2012

(54) SANDWICH PANEL

(75) Inventors: Hiroshi Horigome, Mitaka (JP); Yasunobu Tanaka, Mitaka (JP); Masaaki Hirai, Joetsu (JP); Hiroshi Tanaka, Joetsu (JP)

(73) Assignees: Jamco Corporation, Tokyo (JP); Arisawa Mfg. Co., Ltd., Niigata (JP)

( * ) Notice: Subject to any disclaimer, the term of this patent is extended or adjusted under 35 U.S.C. 154(b) by 868 days.

(21) Appl. No.: 12/137,710

(22) Filed: Jun. 12, 2008

(65) Prior Publication Data

US 2008/0318000 A1 Dec. 25, 2008

(30) Foreign Application Priority Data

Jun. 22, 2007 (JP) ................... 2007-165101

(51) Int. Cl.
*B32B 3/12* (2006.01)
*B32B 3/26* (2006.01)
(52) U.S. Cl. ....... 428/116; 428/188; 428/327; 428/34.5; 428/304.4; 52/302.1
(58) Field of Classification Search .................. None
See application file for complete search history.

(56) References Cited

U.S. PATENT DOCUMENTS

| 3,966,522 | A | * | 6/1976 | Hatch et al. | 156/148 |
| 4,622,091 | A | * | 11/1986 | Letterman | 156/286 |
| 5,490,602 | A | * | 2/1996 | Wilson et al. | 216/56 |
| 6,139,942 | A | | 10/2000 | Hartness et al. | |
| 2008/0131645 | A1 | * | 6/2008 | Horigome et al. | 428/73 |
| 2010/0035018 | A1 | * | 2/2010 | Horigome et al. | 428/116 |

FOREIGN PATENT DOCUMENTS

| DE | 195 21 946 A1 | 12/1996 |
| EP | 0 361 796 A2 | 4/1990 |
| JP | 5-208465 A | 8/1993 |
| JP | 6-17530 Y2 | 5/1994 |
| JP | 2002-227066 A | 8/2002 |
| JP | 2003-019763 A | 1/2003 |
| JP | 2004-269812 A | 9/2004 |
| JP | 2006-150904 A | 6/2006 |

OTHER PUBLICATIONS

Webster's Dictionary, definition of "laminate" (noun & verb). Copyright 1993.*
European Search Report issued in European Application No. 08010711.3-1217 / 2006464 dated Sep. 28, 2010.

* cited by examiner

*Primary Examiner* — David Sample
*Assistant Examiner* — Nicole T Gugliotta
(74) *Attorney, Agent, or Firm* — Sughrue Mion, PLLC

(57) ABSTRACT

There is provided a lightweight sandwich panel of exceptional utility, which satisfies the flexural strength and in-plane shear strength requirements for an inner wall material used in aircraft. The sandwich panel comprises a laminating material in which a plurality of fiber bodies is laminated, and a surface material, the laminating material and the surface material being laminated in the stated order from the inside to the outside on the upper and lower surfaces of a hollow columnar core. The laminating material comprises at least four unidirectional fiber bodies each of which has fibers aligned in a uniform direction and is laminated so that each of the fiber directions thereof is at approximately 0°, +45°, −45°, and 90°, respectively, in relation to one edge of the sandwich panel. The unidirectional fiber bodies are stitched together using a stitching yarn.

5 Claims, 8 Drawing Sheets

FIG. 7

|  | Comparative Example 1 | Comparative Example 2 | Working Example 1 | Working Example 2 |
|---|---|---|---|---|
| Weight (kg/m$^2$) | 2.0 | 2.0 | 2.0 | 2.0 |
| PEEL Strength (N · in/3in) | 90 | 90 | 90 | 90 |
| Flexural loading (N) | 420 | 400 | 580 | 1000 |
| IPS (kN) | 34 | 32 | 38 | 42 |
| Flame retardant /HRR — Five-minute peak heat release rate (kW/m$^2$) | 30 | 30 | 30 | 30 |
| Flame retardant /HRR — Two-minute heat release integral (kW · min/m$^2$) | 40 | 40 | 40 | 40 |
| Smoke density | — | — | 9 | 11 |

SANDWICH PANEL

BACKGROUND OF THE INVENTION

1. Field of the Invention

The present invention relates to a sandwich panel.

2. Description of the Related Art

Honeycomb sandwich panels disclosed in Examined Utility Model Application Publication No. 6-17530 or the like have been used in the past. In such honeycomb sandwich panels, carbon (C) fiber-reinforced plastic bodies are laminated as middle layers onto both upper and lower surfaces (both open end surfaces) of a honeycomb core in which hollow columnar cells are aggregated in a plane, and surface members are laminated on the carbon (C) fiber-reinforced plastic bodies.

Since lightness of weight is associated with better performance in terms of the fuel consumption of aircraft or the like, the weight of the structural and interior materials needs to be reduced. The honeycomb sandwich panel described above, in which fiber-reinforced plastic panels are placed above and below a honeycomb core, is used as a material that yields such a reduction in weight.

In particular, an inner wall material, which is one of the interior materials used in aircraft, is required not only to be lightweight, but also to satisfy flexural strength and in-plane shear strength requirements as a sandwich panel. These characteristics, however, cannot be met merely by changing the amount of fibers or by changing the number of fiber layers that constitute the middle layer.

SUMMARY OF THE INVENTION

In view of the foregoing drawbacks, the present invention provides a sandwich panel wherein each of the fibers in a plurality of unidirectional fiber bodies that constitute a middle layer (a laminating material) are oriented approximately at 0°, +45°, −45°, and 90°; and the unidirectional fiber bodies are stitched together with a stitching yarn (penetrating each layer), whereby the abovementioned requirements of flexural strength and in-plane shear strength can be satisfied while reducing weight and preventing misalignment between each layer in the laminating material. The sandwich panel of the present invention thus has exceptional utility as an inner wall material used in aircraft, for example.

A summary of the present invention will now be given with reference to the accompanying drawings.

The sandwich panel according to a first aspect of the present invention comprises a laminating material 2 in which a plurality of fiber bodies is laminated, and a surface material 3, the laminating material and the surface material being laminated in the stated order from the inside to the outside on the upper and lower surfaces of a hollow columnar core 1, wherein the laminating material 2 comprises at least four unidirectional fiber bodies 4, 5, 6, and 7 each of which has fibers aligned in a uniform direction and is laminated so that each of the fiber directions thereof is at approximately 0°, +45°, −45°, and 90°, respectively, in relation to one edge of the sandwich panel, and the unidirectional fiber bodies 4, 5, 6, and 7 are stitched together with a stitching yarn 8.

The sandwich panel according to a second aspect of the present invention comprises a laminated structure obtained using a laminating material 2 in which a plurality of fiber bodies is laminated on upper and lower surfaces of a hollow columnar core 1, wherein the laminating material 2 comprises at least four unidirectional fiber bodies 4, 5, 6, and 7 each of which has glass fibers aligned in a uniform direction and is laminated so that each of the fiber directions thereof is at approximately 0°, +45°, −45°, and 90°, respectively, in relation to one edge of the sandwich panel, and the unidirectional fiber bodies 4, 5, 6, and 7 are stitched together with a stitching yarn 8.

A sandwich panel according to a third aspect of the present invention is the sandwich panel according to the first aspect, wherein the fibers of the unidirectional fiber bodies 4, 5, 6, and 7 are carbon fibers.

A sandwich panel according to a fourth aspect of the present invention is the sandwich panel according to the third aspect, wherein the surface material 3 is a polyvinylidene fluoride film or unwoven fabric containing glass fibers.

A sandwich panel according to a fifth aspect of the present invention is the sandwich panel according to any one of the first through forth aspects, wherein the laminating material 2 is set to have a resin content of 40% or higher.

The present invention is constituted as described above, and therefore provides a sandwich panel able to exhibit adequate flexural strength and in-plane shear strength while being light in weight and having minimal interlayer misalignment in the laminating material. The sandwich panel of the present invention thus has excellent practical value as an inner wall material used in aircraft, for example.

BRIEF DESCRIPTION OF THE DRAWINGS

FIG. 7 is a table showing experimental results of the present working example;

DESCRIPTION OF THE PREFERRED EMBODIMENTS

Preferred embodiments of the present invention will be briefly described by showing operations of the present invention.

A stitching yarn 8 is used to satisfactorily stitch together individual unidirectional fiber bodies 4, 5, 6, 7 of a laminating material 2, whereby delamination between each layer is prevented and misalignment is unlikely to occur. The structure of the sandwich panel is thus kept rigid.

Moreover, the fiber orientation of the unidirectional fiber bodies 4, 5, 6, 7 is 0°, +45°, −45°, and 90°, respectively, in relation to one edge of the sandwich panel, whereby the laminating material 2 exhibits quasi-isotropic characteristics. Therefore, in-plane shear strength is improved and it is possible to obtain a desired level of in-plane shear strength (preferable for inner wall materials used in aircraft, for example).

After having been laminated and stitched together using the stitching yarn, the unidirectional fiber bodies 4, 5, 6, 7 are impregnated with a resin and bonded together. This structure makes it possible to improve stiffness and to yield a desired level of flexural strength. This is because the laminating material 2 becomes thicker than other structures in which resin-impregnated unidirectional fiber bodies are merely laminated (as will hereinafter be described in detail).

When a resin content is set to 40% or higher, the adhesive characteristics between the hollow columnar core 1 and the laminating material 2, both of which are different types of material, can be maintained for a long period of time.

WORKING EXAMPLE

A specific working example of the present invention will be described based on the drawings.

Figure 1:
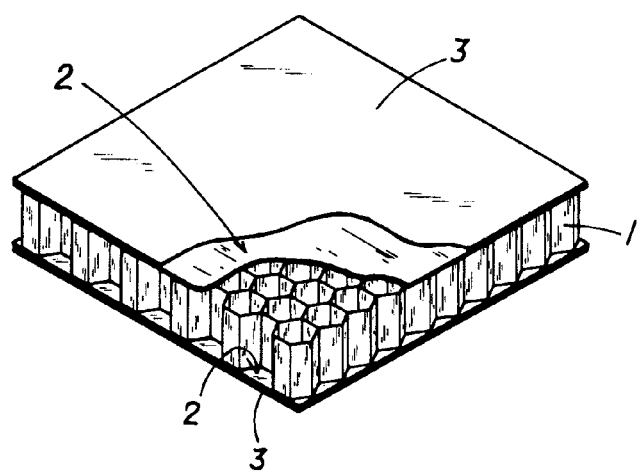
FIG. 1 is a schematic perspective view in which a portion of a present working example has been removed.

As shown in FIG. 1, the present working example is a sandwich panel in which a laminating material 2 formed by laminating a plurality of fiber bodies, and a surface material 3 are laminated in the stated order from the inside to the outside on upper and lower surfaces of a hollow columnar core 1. The laminating material 2 comprises unidirectional fiber bodies 4, 5, 6, 7, each of whose fiber direction is uniform in directions of approximately 0°, +45°, −45°, and 90° in relation to one edge of the sandwich panel. The unidirectional fiber bodies 4, 5, 6, 7 are stitched together using a stitching yarn 8.

Figure 2:
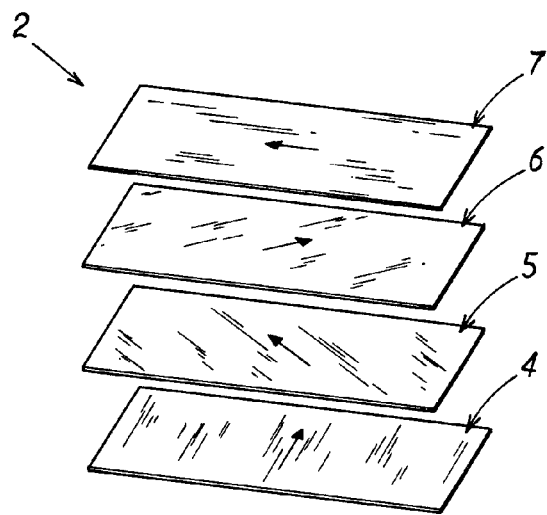
FIG. 2 is an enlarged schematic exploded perspective view showing a relevant portion of the present working example.

In particular, as shown in FIG. 2, the unidirectional fiber bodies 4, 5, 6, 7 are laminated in the stated order from the inside to the outside to constitute the laminating material 2.

A fiber direction of the unidirectional fiber body 4 is set to approximately 0° (substantially parallel) with regard to an edge of the sandwich panel, a fiber direction of the unidirectional fiber body 5 is set to approximately +45° with regard to the edge of the sandwich panel, a fiber direction of the unidirectional fiber body 6 is set to approximately −45° with regard to the edge of the sandwich panel (which substantially intersects the fiber direction of the unidirectional fiber body 5), and a fiber direction of the unidirectional fiber body 7 is set to approximately 90° (substantially orthogonal) with regard to the edge of the sandwich panel.

Accordingly, the laminating material 2 comprises a total of four layers having fiber directions of 0°, +45°, −45°, and 90° each as the unidirectional fiber bodies 4, 5, 6, 7, whereby quasi-isotropic characteristics can be exhibited. In other words, the fiber directions of the unidirectional fiber bodies 5 and 6 are set to +45° and −45°; therefore, the fibers are aligned in a tensile shear direction (vertical direction in a shear test (described hereunder)) and a compressive shear direction (horizontal direction in the shear test). The in-plane shear strength of the sandwich panel is accordingly enhanced. The order in which the unidirectional fiber bodies are laminated is not limited to the order described above.

Each component will now be described in detail.

A paper made of organic fibers (e.g., aramid fibers or cellulose fibers) and impregnated with an incombustible resin, or an aggregate of numerous hexagonal aluminum cells in a plane (honeycomb core 1), is used as the hollow columnar core 1. The hollow columnar core 1 used in the present working example is a honeycomb core 1, which is a paper made of aramid fibers and impregnated with an incombustible resin, and has a density of 3 lb/ft$^3$ (pounds per cubic foot), a thickness of 10.5 mm, and a weight per unit area of 0.51 kg/m$^2$. The hexagons are set to such a size that a length between two opposing edges in the hexagons is ⅛ inch. The length between two opposing edges in the hexagons is not limited to ⅛ inch.

The cell is not limited to being hexagonal in shape, and may be in the form of a square or any other hollow columnar shape. A foam material having numerous holes in an interior thereof, or another spongy porous material may also be used.

Glass fibers, or carbon fibers that are lightweight and have excellent stiffness are employed as the unidirectional fiber bodies 4, 5, 6, 7 to constitute the laminating material 2. Each of the unidirectional fiber bodies may employ different fibers, or a plurality of fiber types may be present in one unidirectional fiber body.

Glass fibers are employed for the unidirectional fiber bodies in the present working example. Glass fibers have good fracture toughness and excellent insulation properties, and accordingly tend not to corrode. Corrosion resistance is thus enhanced. The surface material 3 is also obviated; therefore, the weight of the sandwich panel can be reduced even further.

In the present working example, the structure comprises thin surface materials. This allows for variation when designing the surface appearance.

The unidirectional fiber bodies 4, 5, 6, 7 are stitched together by the stitching yarn 8, impregnated with a heat-curable resin, and heated for five to twenty minutes at 80 to 100° C. to form a prepreg (semi-cure stage), which is used as the laminating material 2.

It is desirable to employ as the surface material 3 a polyvinylidene fluoride film having electrical insulating properties, or an unwoven fabric containing glass fibers (a glass paper, a grass cloth, and the like). When carbon fibers are employed as the fibers of the unidirectional fiber body 7, electrical corrosion does not occur even if the sandwich panel comes into contact with an aluminum material in an aircraft fabrication step. Excellent corrosion resistance is accordingly achieved. In the present working example, a polyvinylidene fluoride film is employed.

The sandwich panel, as shown in FIG. 1, is formed by laminating the laminating material 2 and the surface material 3 in the stated order and performing heating under a pressure of 0.2 to 0.4 MPa for one to two hours for curing.

A structure of the unidirectional fiber bodies 4, 5, 6, 7 as stitched using the stitching yarn 8 in the present working example will now be described.

Figure 3:
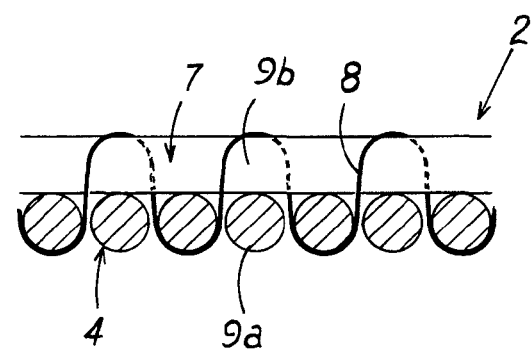
FIG. 3 is an enlarged schematic diagram showing the relevant portion of the present working example.

Specifically, as shown in FIG. 3, the stitching yarn 8 is used to stitch the inner unidirectional fiber body 4 and the outer unidirectional fiber body 7 in every fiber gap in the unidirectional fiber body 7 along a fiber direction of the unidirectional fiber body 7, passing through spaces between the intersecting fibers of the unidirectional fiber bodies 5, 6 placed between the unidirectional fiber bodies 4, 7. The unidirectional fiber bodies 4, 5, 6, 7 are accordingly stitched together. In the present working example, the stitching yarn 8 preferably does not penetrate the fibers of the unidirectional fiber bodies, but optionally penetrates them.

Compared to a structure described later with reference to FIG. 4, in which the unidirectional fiber bodies are bonded only by the resin, the abovementioned structure in the present working example, in which the unidirectional fiber bodies are stitched together by the stitching yarn 8, satisfactorily exhibits excellent shear strength between each layer of the unidirectional fiber bodies and good flexural strength, without the resin content of the laminating material 2 being dramatically increased.

Although increasing the resin content makes it possible to satisfy the requisite peel strength for an inner wall material used in aircraft, the weight will inevitably increase due to the greater resin content. This is accordingly undesirable for an inner wall material used for aircraft where lightness of weight is expected. In the present working example, on the other hand, each layer is stitched together by the stitching yarn so that the resin content is preferably low and good flexural strength can be obtained. Therefore, lightness of weight is achieved and delamination can be prevented.

Figure 5:
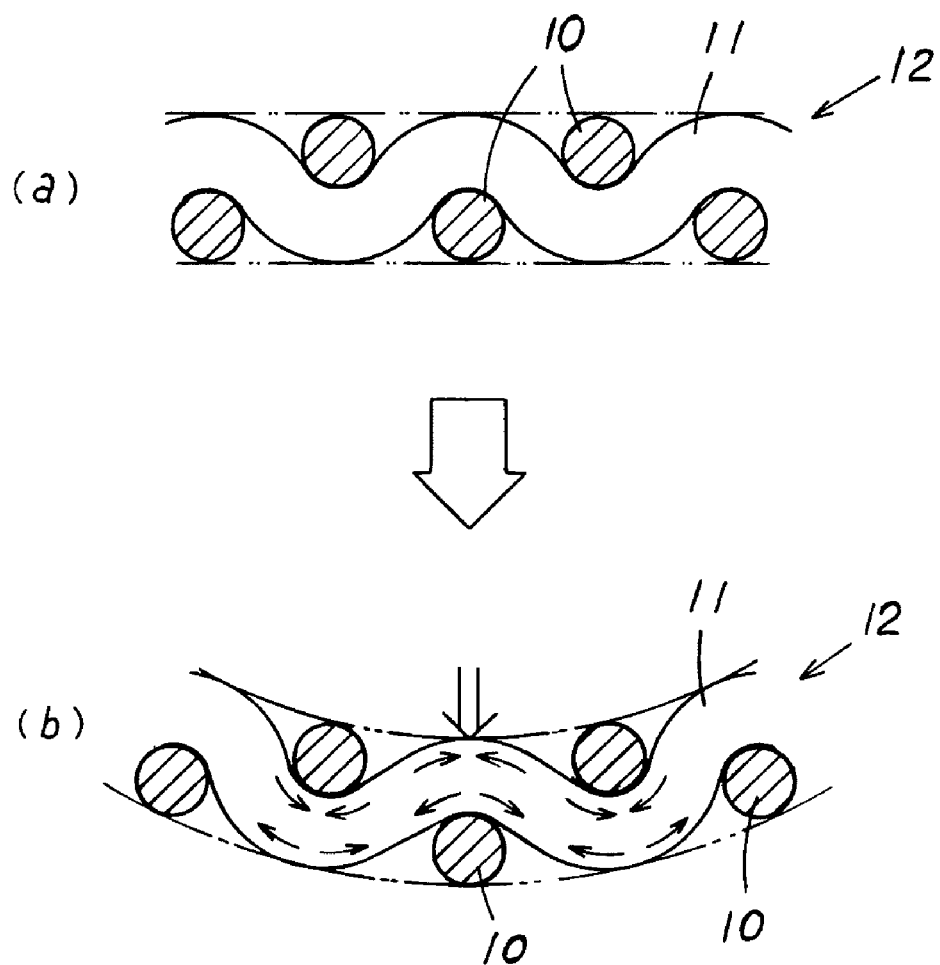
FIG. 5 is a schematic diagram showing the present comparative example when stress is applied.

When using a laminating material 12 in which a first woven fiber body woven with fibers having fiber directions of 0° and 90° and a second woven fiber body woven with fibers having fiber directions of +45° and −45° are laminated instead of the abovementioned unidirectional fiber bodies (FIG. 5(*a*); the fibers having fiber directions of +45° and −45° being omitted for purposes of convenience), it is possible to obtain good peel strength between each layer, without increasing the resin content, in the same manner as in the present working example. Reference symbol 10 in FIG. 5 indicates fibers having an orientation of 0°, and reference symbol 11 indicates fibers having an orientation of 90°.

However, the flexural strength of the laminating material 12 composed of the abovementioned woven fiber bodies is lower than that of the present working example.

Figure 6:
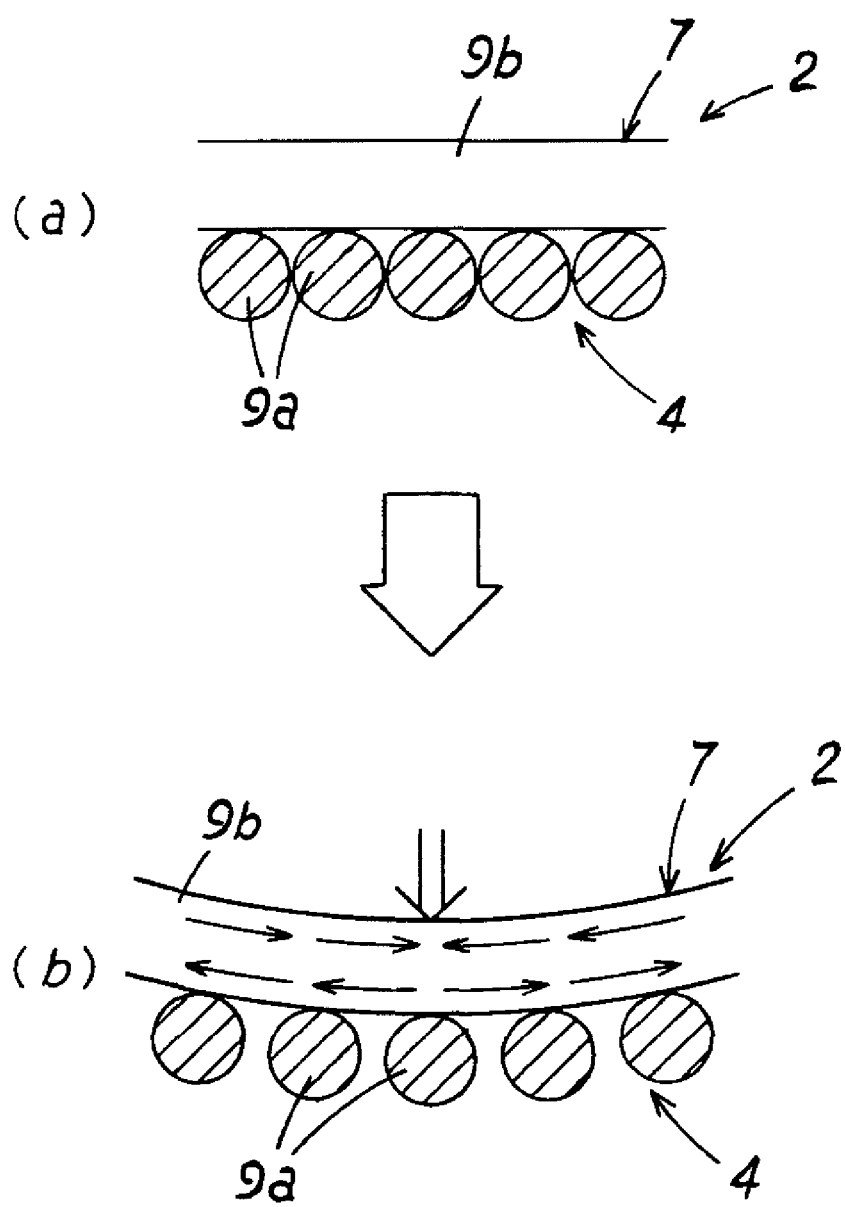
FIG. 6 is a schematic diagram showing the present working example when stress is applied.

When stress is applied to the laminating material 2 in FIG. 6(*a*) (the fibers of the unidirectional fiber bodies 5 and 6, and the stitching yarn 8 have been omitted for purposes of convenience), compression stress acts on both sides of the upper surface of the fibers 9*b* having an orientation of 90° in the unidirectional fiber body 7, which is a load support layer, while a tensile stress acts to the lower surface thereof, as shown in FIG. 6(*b*). Therefore, the compression stress for the upper surface and the tensile stress for the lower surface of the unidirectional fiber body 7 are respectively uniform, and good flexural strength can be obtained. On the other hand, when stress is applied to a fiber body 12 composed of woven fiber bodies as shown in FIG. 5(*a*), both a compression stress acting on the upper surface and a tensile stress acting on the lower surface of the fibers 11 having an orientation of 90° are not respectively uniform, as shown in FIG. 5(*b*). Therefore, good flexural strength cannot be obtained. Reference symbol 9*a* in FIG. 6 indicates the fibers of the unidirectional fiber body 4 having an orientation of 0°.

When using a laminating material 2', which is formed by bonding each unidirectional fiber body only using the resin, the flexural strength of the laminating material 2' will be worse than that of the laminating material 2 of the present working example. This is because the laminating material 2' is not stitched with the stitching yarn 8, and the load increases; therefore, delamination occurs (i.e. the adhesive strength of the laminating material 2' is lower than that of the laminating material 2 of the present working example).

The laminating material 2 in which the unidirectional fiber bodies 4, 5, 6, 7 are stitched together and then impregnated with resin is thicker than the laminating material 2' in which the unidirectional fiber bodies are impregnated with resin first and then laminated together so as to have the same fiber orientations as in the present working example.

Figure 4:
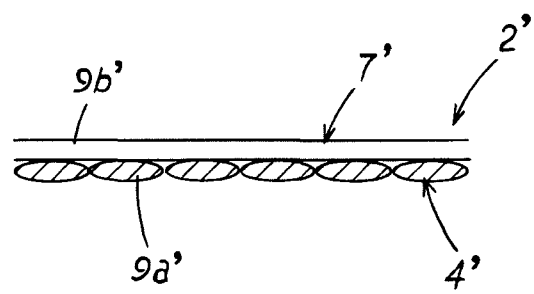
FIG. 4 is an enlarged schematic diagram showing a relevant portion of a present comparative example.

In a structure where each unidirectional fiber bodies impregnated with resin and laminated together, as shown in FIG. 4 (unidirectional fiber bodies which correspond to the unidirectional fiber bodies 5 and 6 in the present working example have been omitted for purposes of convenience), fibers of the fiber bodies (i.e. a bundle of monofilaments) are flat. Therefore the structure is made thinner. This is because each of the unidirectional fiber bodies 4' and 7' becomes smooth and has a flat surface, gaps between the fibers are eliminated, and each of the unidirectional fiber bodies is preferably arranged to have a uniform thickness. Reference symbol 9*a'* in FIG. 4 indicates the fibers of the unidirectional fiber body 4', and reference symbol 9*b'* indicates the fibers of the unidirectional fiber body 7'.

In the present working example, on the other hand, each of the unidirectional fiber bodies 4, 5, 6, 7 is stitched together by the stitching yarn 8, and then impregnated with resin to form a prepreg. It is accordingly possible to obtain a laminate of the unidirectional fiber bodies having a smooth surface without making the fibers 9*a* and 9*b* flat.

Therefore, the structure of the present working example in which the unidirectional fiber bodies are stitched together by the stitching yarn 8 and then impregnated with resin is thicker than the structure in which the unidirectional fiber bodies impregnated with resin are merely laminated. The structure of the present working example thus has excellent stiffness.

The reason that the stiffness improves will now be described based on following experimental examples.

(1) A Laminating Material in which Unidirectional Fiber Bodies Impregnated with Resin are Laminated Together Unidirectional fiber bodies impregnated with resin (prepregs) were prepared and laminated so that each orientation angle of the unidirectional fiber bodies was set to be 0°, +45°, −45°, and 90° (in relation to one edge of a sandwich panel), and then cured using a predetermined amount of heat to form a plate-form FRP. The FRP was 0.02 mm in thickness. The FRP was cut into a width of 77 mm for use. The length was set to 610 mm.

(2) A Laminating Material in Which Unidirectional Fiber Bodies are Stitched Together by a Stitching Yarn Unidirectional fiber bodies were laminated to have the same fiber orientations as the unidirectional fiber bodies of the abovementioned (1), and then stitched together with a stitching yarn. The stitched unidirectional fiber bodies were impregnated with resin using a free dipping method, and cured with a predetermined amount of heat to form a plate-form FRP. The thickness of the FRP was 0.35 mm. The FRP was cut into a width of 77 mm to use. The length was set to 610 mm.

The stiffness of the FRPs (1) and (2) above was represented by the following formula:

$$D(\text{kg·mm}^2) = E(\text{kg/mm}^2) \times I(\text{mm}^4)$$

where
D: stiffness
E: elastic modulus
I: geometric moment of inertia.

Since the same fiber bodies and resin were used, a relationship between the elastic modulus of the FRP (1) or $E_{(1)}$, and the elastic modulus of the FRP (2), or $E_{(2)}$, is $E_{(1)} = E_{(2)}$.

The geometric moment of inertia, or I, can be shown as a following formula:

$$I = 1/12 \times W \times t^3 (\text{mm}^4)$$

Where
W: width of FRP (mm)
t: thickness of FRP (mm).

Therefore, using the formula of the geometric moment of inertia (I) above, the geometric moment of inertia of the FRP (1), or $I_{(1)}$ is 0.0513 mm$^4$, and the geometric moment of inertia of the FRP (2), or $I_{(2)}$ is 0.2751 mm$^4$.

Thus, the following formula is provided for a ratio of stiffness of the laminating material (2) to that of the laminating material (1).

$$D_{(2)}/D_{(1)} = E_{(2)}I_{(2)}/E_{(1)}I_{(1)} = I_{(2)}/I_{(1)} = 5.36$$

According to the above description, the laminating material in which the unidirectional fiber bodies are impregnated with resin first and then stitched together by the stitching yarn was more than five times stiffer than the unstitched laminating material in which the unidirectional fiber bodies are impregnated with resin and merely laminated together.

The resin used in the prepregs was a resol-type phenolic resin selected with consideration for non-combustibility as an inner wall material for an aircraft interior. Specifically, the resol-type phenolic resin had a five-minute peak heat release rate of 30 kW/m$^2$ or less in a heat release test (HRR), a two-minute heat release integral of 30 kw·min/m$^2$ or less, and a smoke density of 200 or less during combustion. The abovementioned values are obtained when the HRR and the smoke density are measured in accordance with the FAR25.853 specification required for aircraft interiors.

It is also preferable for the resin content of the unidirectional fiber bodies 4, 5, 6, 7 (i.e. the laminating material 2), which are stitched together by the stitching yarn 8, to be 40% or higher so that a good adhesion property can be obtained between the honeycomb core 1 and the unidirectional fiber bodies 4, 5, 6, 7 stitched with the stitching yarn 8, both of which are different types of materials.

According to the abovementioned structure in the present working example, it can be confirmed that delamination between each layer is prevented and misalignment is unlikely to occur in the heat-pressing process. Thus, the structure of the sandwich panel is firmly kept.

Moreover, each fiber orientation of the unidirectional fiber bodies 4, 5, 6, 7 is 0°, +45°, −45°, and 90° in relation to one edge of the sandwich panel; therefore the laminating material 2 exhibits quasi-isotropic characteristics. The in-plane shear strength is thus improved, and it is possible to obtain a desired level of in-plane shear strength (suitable for inner wall materials used in aircraft, for example).

Additionally, the laminating material 2 in the structure where the unidirectional fiber bodies 4, 5, 6, 7 are laminated, stitched together by the stitching yarn, and then impregnated with resin is thicker than in the structure where the unidirectional fiber bodies impregnated with resin are merely laminated. Therefore, stiffness is improved, and a desirable bending load can be obtained.

Furthermore, when the resin content of the laminating material 2 is 40% or higher, the adhesion property between the hollow columnar core 1 and the laminating material 2, both of which are different types of material, is maintained for a long period of time.

Accordingly, the present working example provides a sandwich panel enabling the abovementioned flexural strength and in-plane shear strength to be met while also reducing weight and preventing misalignment between each layer in the laminating material. The sandwich panel of the present working example thus has excellent utility as an inner wall material used in aircraft, for example.

An experimental example will now be described in order to confirm the effect of the present working example.

Comparative example 1 is a sandwich panel in which a laminating material that is formed by laminating four unidirectional fiber bodies, and a surface material are laminated in the stated order from the inside to outside on upper and lower surfaces of a hollow columnar core, wherein each fiber direction of the unidirectional fiber bodies comprising glass fibers is set to 0°, 45°, −45°, and 90°. The unidirectional fiber bodies are impregnated with a resin and then laminated together to form the laminating material. Working example 1 is a sandwich panel incorporating a laminating material in which the unidirectional fiber bodies are stitched together first by a stitching yarn, and then impregnated with resin. Working example 2 is a sandwich panel with the same configuration with the working example 1, but carbon fibers are used as the fibers of the unidirectional fiber bodies. Comparative example 2 is a sandwich panel incorporating a laminate of two woven fiber bodies as a laminating material, where the two woven fiber bodies are woven with first fibers having a fiber orientation of 0° and second fibers having a fiber orientation of 90°, and laminated in such a manner that one of the two woven fiber bodies is slanted by 45° with respect to the other. The weight, peel strength, flexural strength, in-plane shear strength, flame retardancy, and smoke density of each of the abovementioned structures was measured, and the results are shown in FIG. 7.

Figure 8:
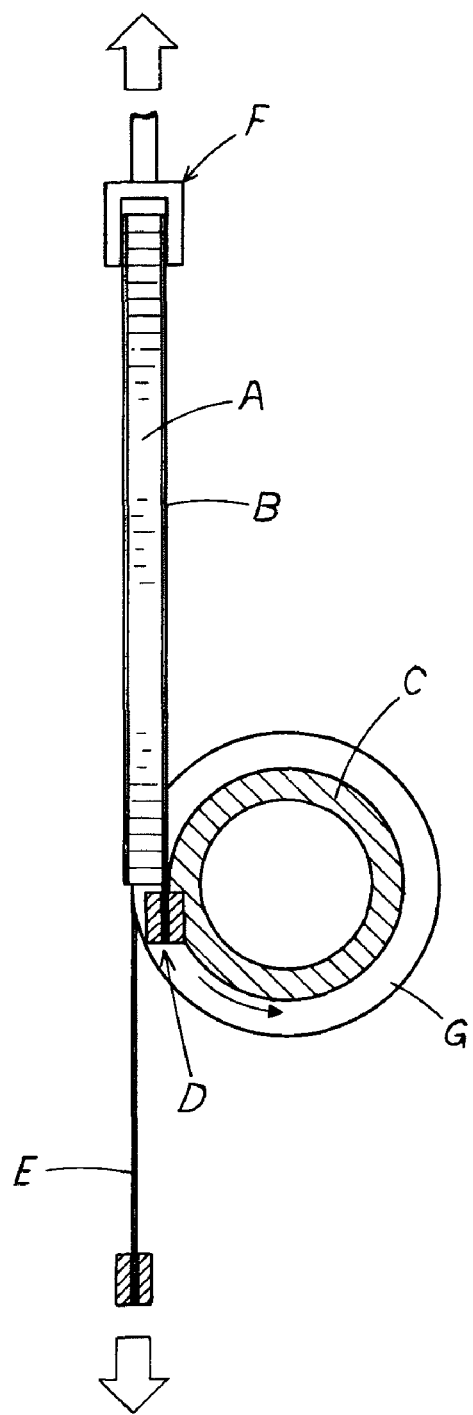
FIG. 8 is a schematic diagram showing an experimental apparatus.

The peel strength was measured using a common drum peel testing apparatus, as shown in FIG. 8. The reference symbol A in the diagram indicates the honeycomb core, B indicates the laminating material, C indicates a drum, D indicates a lower clamp, E indicates a loading strap, F indicates an upper clamp, and G indicates a flange.

Figure 9:
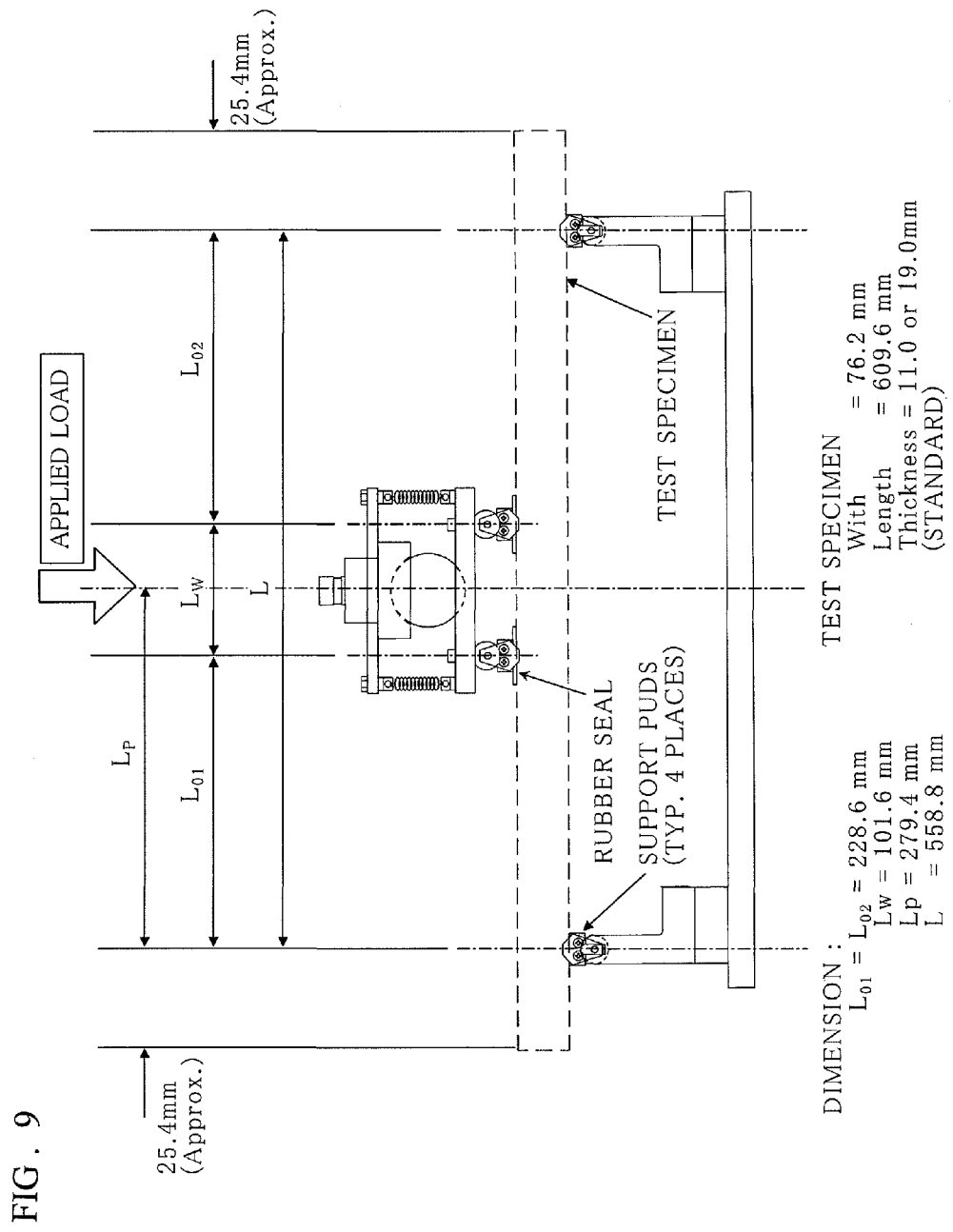
FIG. 9 is a schematic diagram showing an experimental apparatus.

The flexural strength (bending load) was measured at normal temperature (23±2° C.) and normal humidity (50±5% RH) using a type of device shown in FIG. 9 in accordance with the bend test specification MIL-STD401B. The rate was set so that the sample would break in 3 to 5 minutes.

Figure 10:
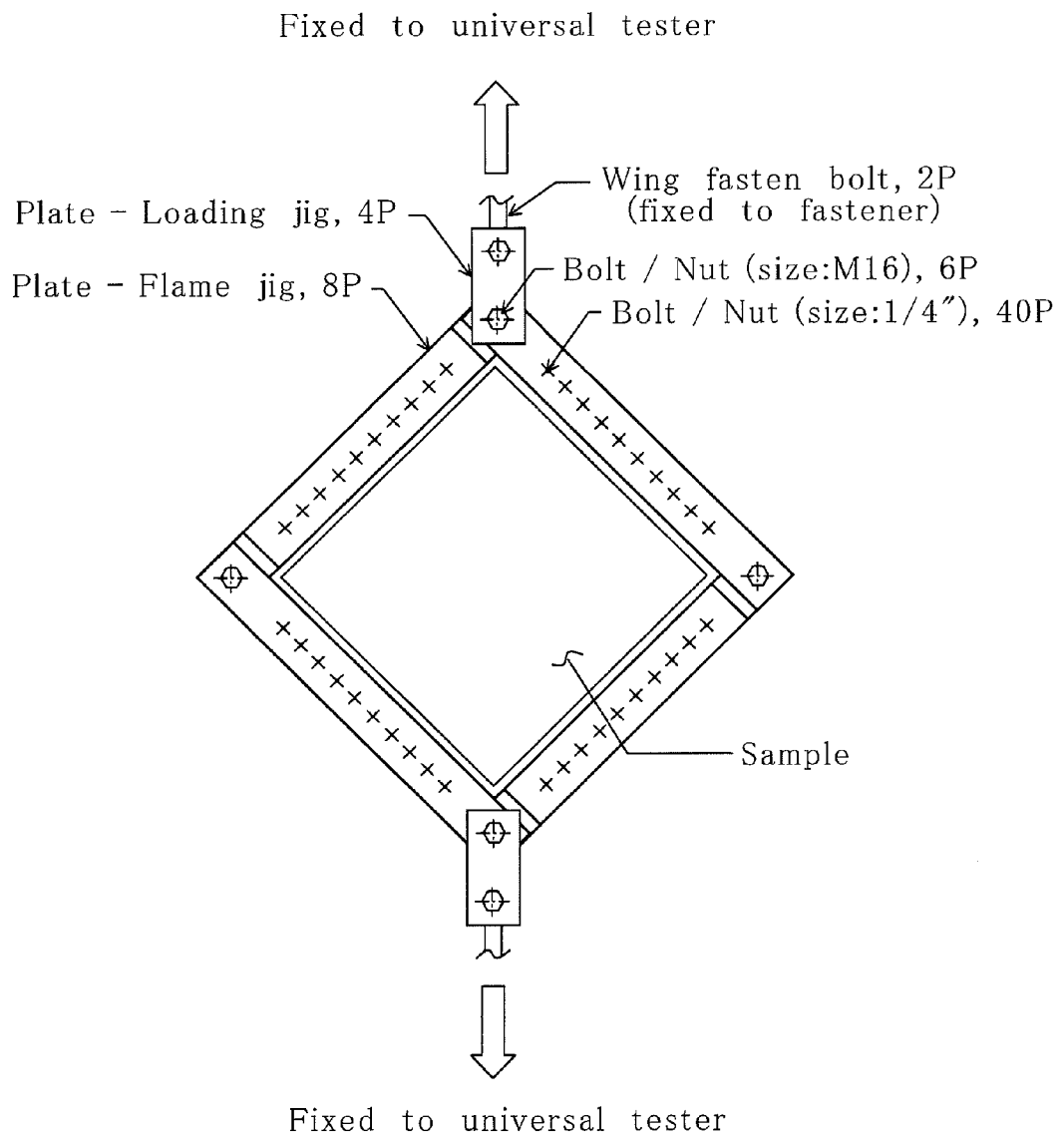
FIG. 10 is a schematic diagram showing an experimental apparatus.

The in-plane shear strength (IPS) was measured using a type of device shown in FIG. 10 in accordance with an in-plane shear test (BMS4-17) used by Boeing Company (the measurement device was a Shimadzu Autograph AG-10).

It was apparent from the test results that the flexural strength and IPS of Working Examples 1 and 2 improved without an increase in weight, as contrasted with Comparative Examples 1 and 2.

Namely, in contrast with the sandwich panel in which the unidirectional fiber bodies were only laminated without using the stitching yarn, the stiffness was better in the sandwich panel in which the unidirectional fiber bodies were stitched together using the stitching yarn. Therefore, it was confirmed that a good bending load property for a sandwich panel could be obtained.

Moreover, in the heat-press process, misalignment between each layer was prevented by the stitching. It was also confirmed by a visual check that the structure of the sandwich panel remained firm.

Furthermore, a comparison of Working Examples 1 and 2 confirmed that the use of carbon fibers further improved the flexural strength and IPS. Specifically, the flexural strength of Working Example 2 was 2.4 times that of the comparative examples, which represents a significant improvement. The smoke density of both the working examples 1 and 2, on the other hand, was low.

According to the abovementioned results, stitching together the unidirectional fiber bodies to constitute the laminating material was confirmed to yield a lightweight sandwich panel that satisfies the flexural strength and in-plane shear strength required for an inner wall material used in aircraft.

What is claimed is:

1. A sandwich panel comprising:
   a hollow columnar core having an upper surface and a lower surface;
   a pre-impregnated laminating material comprising at least four unidirectional fiber bodies, a resol-type phenolic resin material, and a stitching yarn for stitching the at least four unidirectional fiber bodies, the laminating material directly disposed on each of the upper surface and the lower surface of the hollow columnar core, respectively; and
   a surface material directly disposed on each of the laminating materials, so that each of the laminating materials is disposed between the surface material and the hollow columnar core, the surface material being a polyvinylidene fluoride film or an unwoven fabric containing glass fibers, wherein the at least four unidirectional fiber bodies each has fibers aligned in a uniform direction and is disposed so that each of the fiber directions thereof is at approximately 0°, +45°, −45°, and 90°, respectively, in relation to one edge of the sandwich panel.

2. A sandwich panel comprising a laminated structure obtained using a laminating material in which a plurality of fiber bodies is laminated on upper and lower surfaces of a hollow columnar core, wherein the laminating material comprises at least four unidirectional fiber bodies each of which has glass fibers aligned in a uniform direction and is laminated so that each of the fiber directions thereof is at approximately 0°, +45°, −45°, and 90°, respectively, in relation to one edge of the sandwich panel;

said unidirectional fiber bodies are stitched together using a stitching yarn;

the stitching yarn stitches substantially every fiber gap in at least one of the at least four unidirectional fiber bodies; and the laminating material comprises a resol-type phenolic resin-impregnated material prior to being attached to the hollow columnar core.

3. The sandwich panel according to claim 1, wherein the fibers of the unidirectional fiber bodies are carbon fibers.

4. The sandwich panel according to any one of claims 1 through 3, wherein a resin content of the laminating material is set to 40% or higher.

5. The sandwich panel according to claim 1, wherein the stitching yarn stitches substantially every fiber gap in at least one of the at least four unidirectional fiber bodies.

* * * * *